(12) United States Patent
Radovinsky (10) Patent No.: US 9,721,709 B2
(45) Date of Patent: Aug. 1, 2017

(54) INDUCTIVELY DECOUPLED DUAL SMES IN A SINGLE CRYOSTAT

(71) Applicant: Novum Industria LLC, New York, NY (US)

(72) Inventor: Alexey Radovinsky, Cambridge, MA (US)

(73) Assignee: Novum Industria LLC, New York, NY (US)

( * ) Notice: Subject to any disclaimer, the term of this patent is extended or adjusted under 35 U.S.C. 154(b) by 165 days.

(21) Appl. No.: 14/727,181

(22) Filed: Jun. 1, 2015

(65) Prior Publication Data

US 2015/0357104 A1    Dec. 10, 2015

Related U.S. Application Data

(60) Provisional application No. 62/007,684, filed on Jun. 4, 2014.

(51) Int. Cl.
| | |
|---|---|
| *H01F 27/28* | (2006.01) |
| *H01F 6/06* | (2006.01) |
| *H01F 6/04* | (2006.01) |
| *F25D 3/10* | (2006.01) |
| *F17C 3/08* | (2006.01) |
| *H02J 15/00* | (2006.01) |

(52) U.S. Cl.
CPC ............... *H01F 6/06* (2013.01); *F17C 3/085* (2013.01); *F25D 3/102* (2013.01); *H01F 6/04* (2013.01); *H01F 27/28* (2013.01); *H02J 15/00* (2013.01)

(58) Field of Classification Search
CPC ..................... H01F 5/00; H01F 27/00–27/30
USPC ..................... 336/55–62, 225, 229
See application file for complete search history.

(56) References Cited

U.S. PATENT DOCUMENTS

| | | | | |
|---|---|---|---|---|
| 4,920,095 A | * | 4/1990 | Ishigaki | ............... H01F 6/00 322/2 R |
| 5,160,911 A | | 11/1992 | Herring | |

(Continued)

FOREIGN PATENT DOCUMENTS

| | | |
|---|---|---|
| WO | 94/03910 A1 | 2/1994 |
| WO | 00/39815 A1 | 7/2000 |

OTHER PUBLICATIONS

P. Tixador, "SMES. Superconducing Magnetic Energy Storage," Presentation at the European Summer School on Superconductivity, 2011.

(Continued)

*Primary Examiner* — Tuyen Nguyen
(74) *Attorney, Agent, or Firm* — Nields, Lemack & Frame, LLC (57) ABSTRACT

Various SMES systems that include two magnets in a single cryostat are disclosed. These dual SMES systems can be used, for example, to provide uninterrupted power to a data center. The two coil sets are arranged such that they are magnetically decoupled from each other. In one embodiment, a toroidal coil set is used as the primary coil set. The toroidal coil set has a plurality of toroidal field (TF) coils extending radially outward and evenly spaced in the circumferential direction. The second coil set may be a solenoidal coil set having a main coil and a plurality of shielding coils. The toroidal coil set may be disposed in the space between the main coil and the shielding coils of the solenoidal coil set. Alternate designs are also presented.

7 Claims, 7 Drawing Sheets

(56) References Cited

U.S. PATENT DOCUMENTS

| | | | | |
|---|---|---|---|---|
| 5,334,964 | A | * | 8/1994 | Voigt .................... H01F 6/06 335/216 |
| 5,473,301 | A | * | 12/1995 | Hall ..................... H01F 6/006 335/216 |
| 5,812,042 | A | | 9/1998 | Maki et al. |
| 2004/0251999 | A1 | * | 12/2004 | Darmann ............... H01F 6/06 336/180 |
| 2008/0062588 | A1 | | 3/2008 | Bromberg et al. |
| 2012/0306606 | A1 | * | 12/2012 | Noe .................. H01F 38/023 336/55 |

OTHER PUBLICATIONS

Abdo A. Husseiny, Zeinab A. Sabri, "Air Force Superconductive Magnetic Energy Storage (SMES) Requirements", Apr. 1993.
P. Tixador, "Superconducting Magnetic Energy Storage: Status and Perspective," IEEE/CSC&ESAS European Supercon. News Forum, No. 3, Jan. 2008.
International Search Report and Written Opinion mailed Dec. 21, 2015 in corresponding PCT application No. PCT/US15/33684.

* cited by examiner

INDUCTIVELY DECOUPLED DUAL SMES IN A SINGLE CRYOSTAT

This application claims priority of U.S. Provisional Patent Application Ser. No. 62/007,684, filed Jun. 4, 2014, the disclosure of which is incorporated herein by reference in its entirety.

FIELD

Embodiments of the present disclosure relate to superconducting magnetic energy storage systems (SMES), and more particularly, dual SMES in a single cryostat.

BACKGROUND

Superconducting Magnets for Energy Storage (SMES) systems have high potential for being used in various capacities for various applications. Some applications require several energy storage systems with different characteristics, such as the total stored energy, discharge rate, mode of operation, etc. Each SMES installed in its individual cryostat requires a cooling system and the magnets have to be installed at some distance, in order to minimize the inductive coupling via their respective stray magnetic fields, which can have a negative effect on their performance.

It would be advantageous if it were possible to combine two or more SMES magnets in a single cryostat. Combining several SMES magnets in one cryostat can result in substantial savings both in the cost of the equipment and in the space requirements for its installation.

SUMMARY

Various SMES systems that include two coil sets in a single cryostat are disclosed. These dual SMES systems can be used, for example, to provide uninterrupted power to a data center. The two coil sets are arranged such that they are magnetically decoupled from each other. In other words, there is no mutual inductance between the two coil sets. In one embodiment, a toroidal coil set is used as the primary coil set. The toroidal coil set has a plurality of toroidal field (TF) coils extending radially outward and evenly spaced in the circumferential direction. The second coil set may be a solenoidal coil set having a main coil and a plurality of shielding coils. The toroidal coil set may be disposed in the space between the main coil and the shielding coils of the solenoidal coil set. Alternate designs are also presented.

BRIEF DESCRIPTION OF THE FIGURES

For a better understanding of the present disclosure, reference is made to the accompanying drawings, which are incorporated herein by reference and in which.

DETAILED DESCRIPTION

In some embodiments, this disclosure is directed to multiple SMES systems used in the data centers. There are several functions that can be served by SMES systems in the electrical power system of a data center. However, it is noted that the multiple SMES described herein can be used for other applications as well.

One attractive application is using SMES for providing an Uninterrupted Power Supply (UPS) of the data processing equipment in case of a power failure of the general electrical grid. Local power generators incorporated in the power supply system can provide continuous power supply for quite a long time. However, some time is required to start these generators and to bring their output to the required steady-state level. A primary, high energy capacity, SMES can supply the power during this transitional period. Since this is a very rare event, it is convenient to run this SMES in a persistent mode. This minimizes the cooling requirements by removing the current leads from the current path during the idle time. The downside of this feature is that a very short but still finite time is required to switch the SMES from the persistent mode to the working condition and to start supplying the equipment with the electrical power from this SMES.

A secondary, smaller capacity, SMES staying online permanently, can bridge this time gap and will provide the power while the primary SMES goes online. The same secondary SMES can be used continuously to facilitate power conditioning of the grid signal resulting from various voltage spikes and instabilities.

General requirements to the magnet configurations used for SMES include high Specific Energy defined as the Stored Magnetic Energy per unit Weight of the Superconductor and good field containment resulting in safely low stray magnetic fields in the vicinity of the magnet. Those skilled in the art are aware of magnetic topologies that can satisfy these requirements to some extent. Mechanical and cost-related considerations also apply. They are not addressed in this proposal, which is limited to considering only magnetic designs of some dual SMES options.

Constant Field Toroidal Magnet

One of the more traditional configurations of a SMES magnet is a toroidal coil. Typically, this design is given preference over other magnet topologies because it provides the best field containment and, consequently, the highest density of the magnetic field and a very low level of stray fields, even at small distances from the magnet.

The main drawback of the conventional toroidal magnets comprised of multiple racetrack-shaped coils is the inverse relationship between magnetic field and the radius, r. This results in a distribution of the magnetic field that peaks up at the outer side of the inner leg of the racetrack and then decays as 1/r, resulting in rather inefficient space utilization.

To mitigate this disadvantage, a toroidal magnet comprised of discrete graded coils creating an almost constant magnetic field in a large volume inside the magnet may be used on one embodiment.

Figure 1A:
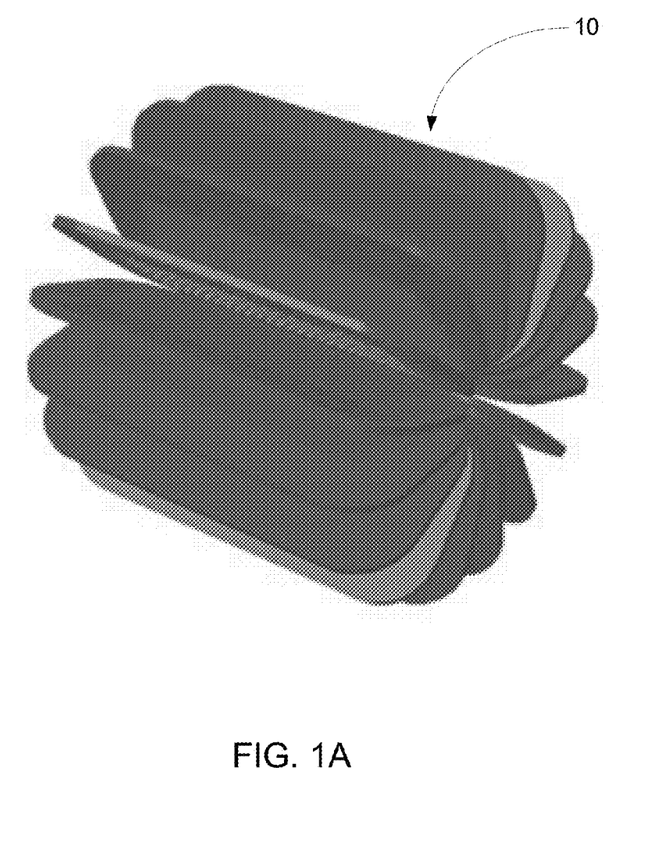
FIGS. 1A-1B show conventional toroidal coils that may be used with the dual SMES according to one embodiment of the present disclosure.
Figure 1B:
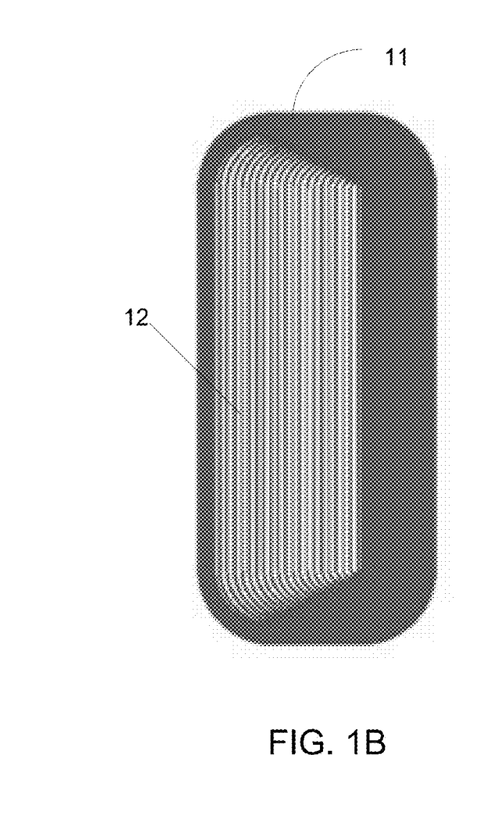

Originally, "alternative toroid" design was defined in terms of a 1D axisymmetric radial function of non-uniform current density distribution. In the present disclosure, this distribution is discretized both azimuthally and radially to be represented by a multiplicity of conventional racetracks as shown in FIGS. 1A and 1B. This discretization leads to a more convenient for implementation constant current density distribution.

Consider a coil system comprised of N Toroidal Field (TF) coils extending radially outward and evenly spaced in the circumferential direction. FIGS. 1A and 1B depict a magnet 10 having N=16 TF coils 11 and a view of a single TF coil 11, respectively. Each TF coil 11 is comprised of multiple racetracks 12 arranged as described below.

Figure 2A:
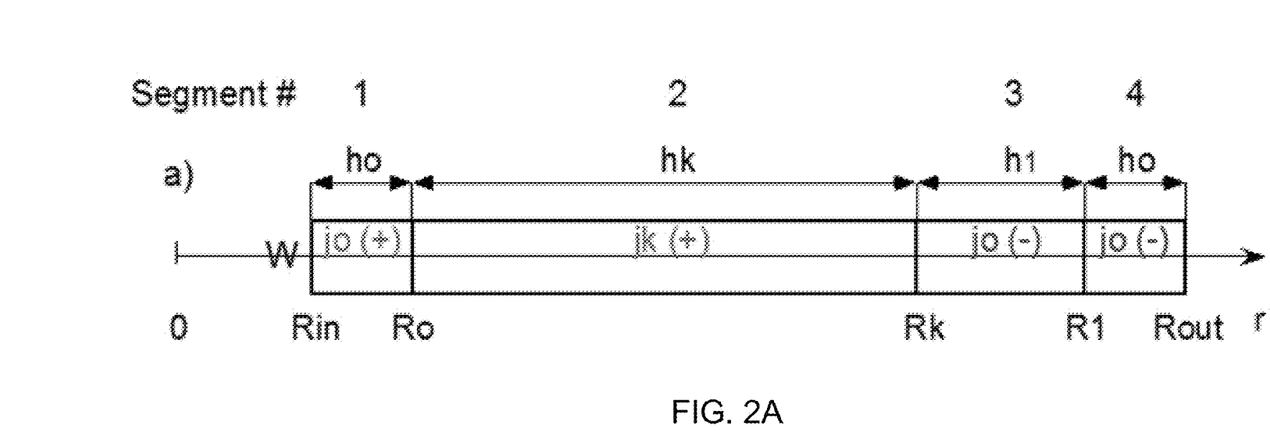
FIG. 2A depicts the mid-plane cross section of a single racetrack assuming constant current densities.
Figure 2B:
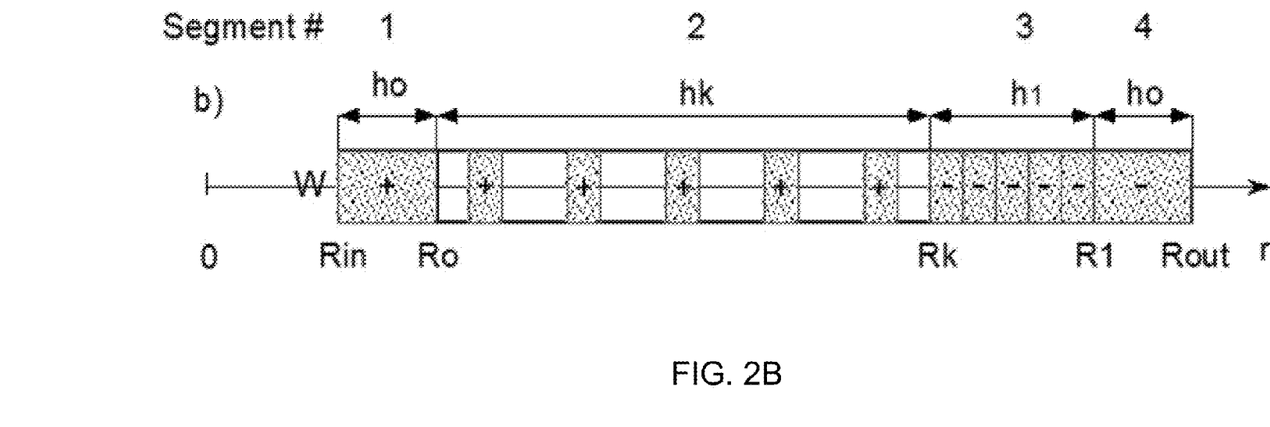
FIG. 2B depicts discretization of the current distribution shown in FIG. 2A.

The straight legs of the racetracks 12, which are parallel to the axis of the magnet 10, are arranged for the best compliance with the current distribution shown in the schematics in FIGS. 2A and 2B. FIG. 2A depicts the mid-plane cross section of a single racetrack 12 assuming constant current densities.

In FIG. 2A, W is the width of the racetrack winding. Rin and Rout are radial boundaries, where R0=Rin+h0. There are four segments; which are h0, hk, h1 and h0 long, respectively. Current flows in a direction that is normal to the page. Respective current densities in the segments are j0, jk, j0 and j0, those marked by (+) are opposite to those marked by (−). Lengths (h0, hk, h1) and current densities (j0, jk) are scaled so that the total current in all bars is an algebraic zero.

The following parameters are given:
B0—maximum target field in the system;
j0—current density in segments 1, 3 and 4;
N—rotational symmetry of the system;
Rout—outer radial limit of the coils;
Lc—axial extent of the coils (in z-direction);
W—width of the coil; and
dRin—see below.

System parameters may be calculated by the following procedure:
1. Rmin=W/2*Cot($\pi$/N), wherein Rmin is the minimum radial position of the coil to avoid overlapping in the left corners in FIG. 2A;
2. Rin=Rmin+dRin—actual radial position where the coils begin, dRin≥0 is a parameter of choice;
3. h0=Rin*k/(1−k), where k=2*B0/($\mu_0$*N*W*j0);
4. R0=Rin+h0, wherein R0 is the outer radial limit of segment 1; and
5. jk=k*j0, where jk is the current density in segment 2
6. hk=(Rout−R0−h0)/(1+k), h1=k*hk are the radial extents of segments 2 and 3, respectively.

FIG. 2B depicts discretization of the current distribution shown in FIG. 2A. Segments 1 and 4 represent the opposite legs of the main racetrack. Segments 2 and 3 are broken up into equal numbers, m, of current legs of the inner racetracks, each with the same current density, j0. Discrete currents in Segment 2 are spaced evenly to better match the uniformity of jk.

Coil Set A

Figure 3A:
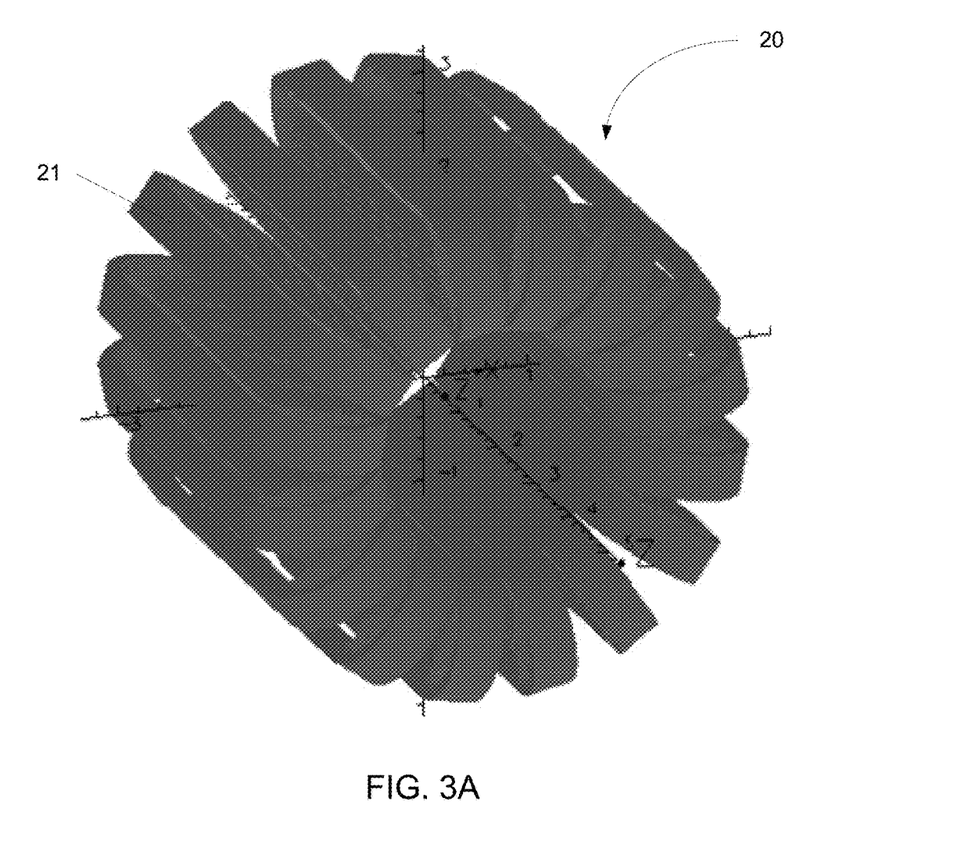
FIG. 3A is a coil set comprised of N=16 toroidal coils.
Figure 3B:
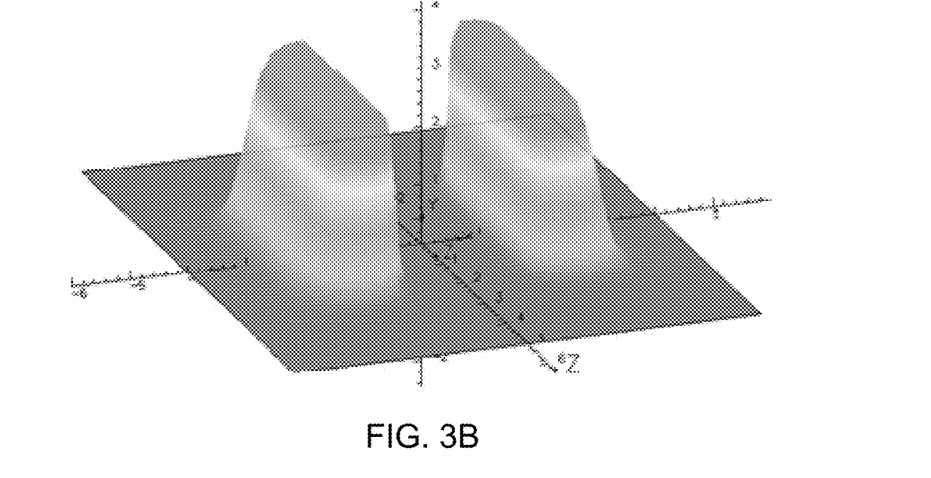
FIG. 3B depicts a histogram of the magnetic field at the axial cross section of the coil set of FIG. 3A.

Assume that a high energy capacity toroidal magnet (referred to as Coil set A 20) is to be the primary SMES. The magnet, coil set A 20, shown in FIG. 3A, is comprised of N=16 toroidal coils 21. The magnetic field of Coil set A 20 is contained in a toroidal volume. FIG. 3B depicts a histogram of the magnetic field at the axial cross section of Coil set A 20. Fringe fields outside the high constant field area are very small.

Coil Set B

The desired properties of the secondary SMES are:
1. it has to be magnetically decoupled from the primary magnet, and
2. it has to have relatively small fringe fields.

Figure 4A:
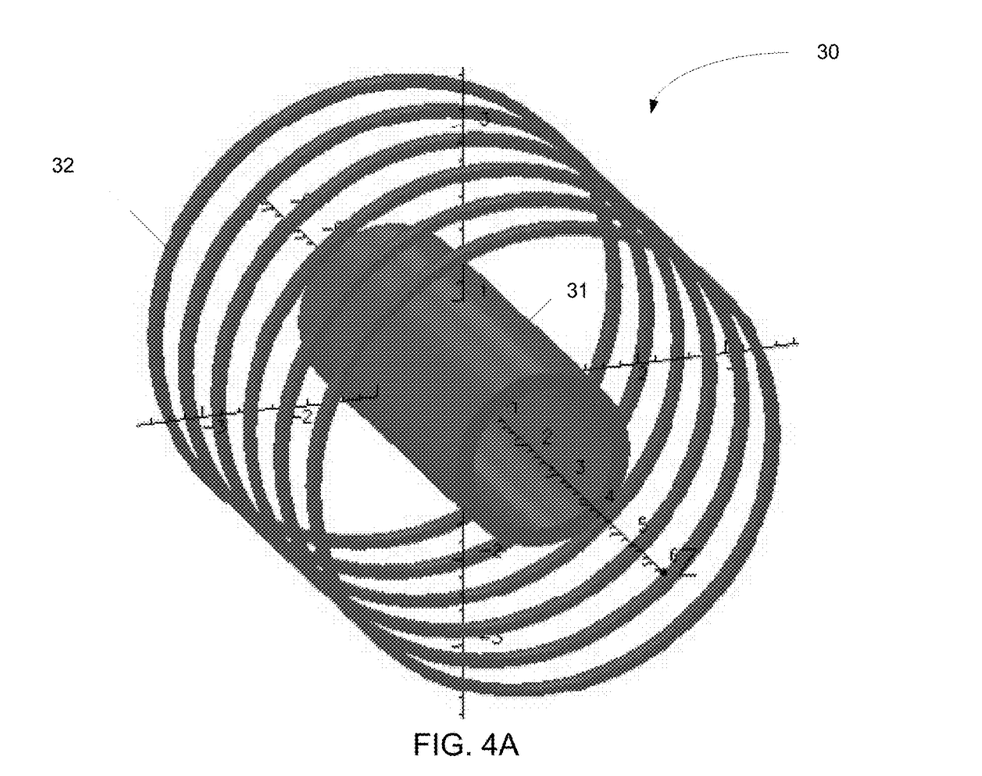
FIG. 4A is a solenoidal magnetic system.
Figure 4B:
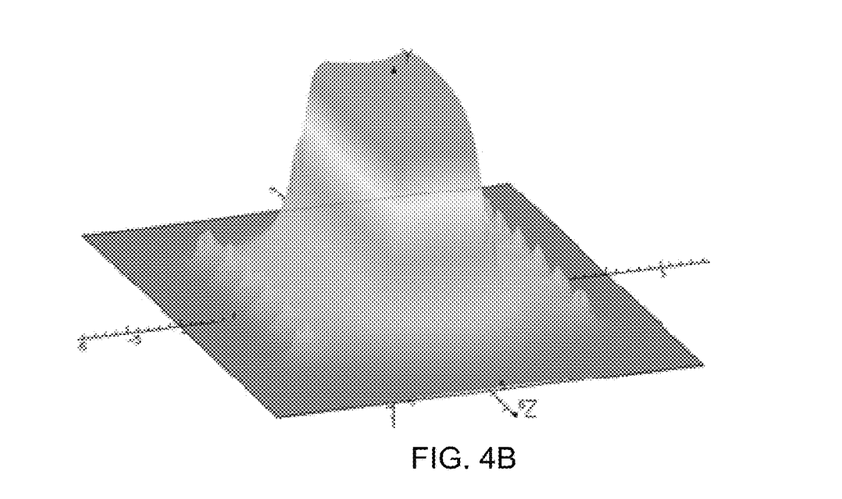
FIG. 4B depicts a histogram of the magnetic field at the axial cross section of the coil set of FIG. 4A.

A solenoidal magnetic system (Coil set B) shown in FIG. 4A is one of the topologies satisfying both requirements. Coil set B 30 is comprised of the main coil 31, a big solenoid forming the core of the magnet, and multiple shielding coils 32. The shielding coils 32 are larger radius and smaller cross section solenoids with current moving in the direction opposite to that of the current in the main coil 31. Most of the magnetic field of Coil set B 30 is contained in a cylindrical volume inside the main coil 31. FIG. 4B depicts a histogram of the magnetic field at the axial cross section of Coil set B 30. Currents in the Main coil 31 and in the Shielding Coils 32 are selected so that the fringe field outside the magnet 30 is safely low. The poloidal field in the cylindrical space between the Main coil 31 and the Shielding coils 32 is much smaller than inside the Main coil 31.

Coil Set A+B

Figure 5A:
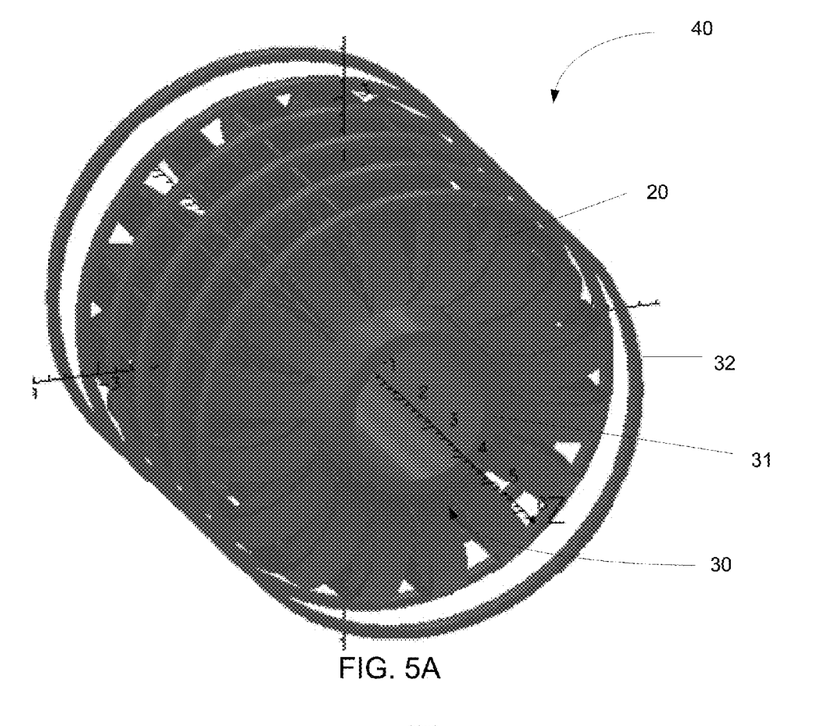
FIG. 5A shows a combined system employing the coil set of FIG. 3A and FIG. 4A.
Figure 5B:
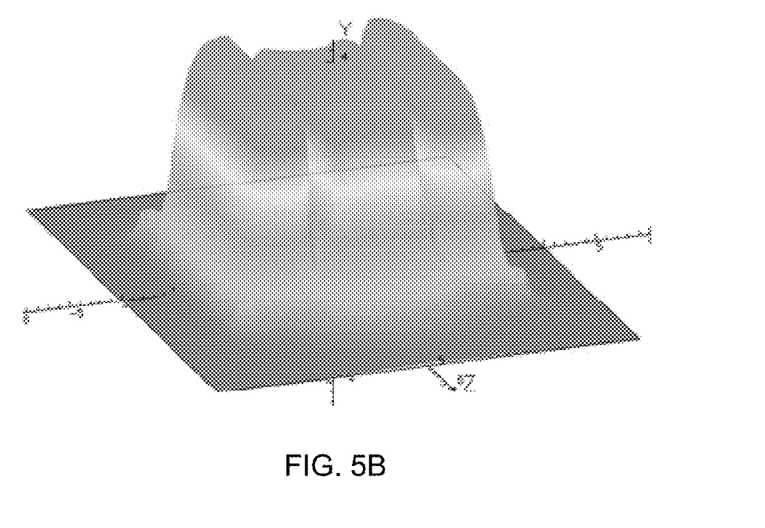
FIG. 5B depicts a histogram of the magnetic field at the axial cross section of the magnet of FIG. 5A.

A combined or dual SMES system (Coil set A+B 40), comprised of two magnets, one formed by Coil set A 20 and the other by Coil set B 30, installed in one cryostat is a good candidate for being used in the data centers. An example of this combined system 40 is shown in FIG. 5A. The toroidal Coil set A 20 is conveniently installed in the free space between the Main coil 31 and the Shielding coils 32 of Coil set B 30. Operating currents in Coil set A 20 and Coil set B 30 are scaled so that the peak fields on the superconductors in each of these are set to the respective safe values defined by the magnetic design. FIG. 5B depicts a histogram of the magnetic field at the axial cross section of Coil set A+B 40. In this particular design, currents in the magnets of Coil sets A and B are scaled so that the maximum fields in the high field volumes of both Coil sets are the same.

Each of the coil system A 20 and the coil system B 30 forms its own independent power circuit. Coils of each of the subsystems are connected in series forming respective circuits A and B. Though individual coils of circuits A and B are inductively coupled, circuits A and B are fully decoupled, i.e. the magnetic flux of Coils A integrated over circuit B is always zero, and vice versa.

Since the mutual inductance between the decoupled Coil sets A and B is zero, the following law is characteristic of a dual SMES. At a working point $E_{A+B}$, magnetic energy stored in Coil set A+B, is an exact sum of respective magnetic energies, $E_A$ and $E_B$, stored in Coil sets A and B, measured when the current in the other Coil set is zero, $$E_{A+B}=E_A+E_B \tag{1}$$

In the particular case depicted in FIG. 5A, energies, $E_A$ and $E_B$, comprise exactly 80% and 20% of $E_{A+B}$, respectively. In other embodiments, the energy in Coil set A is more than the energy stored in Coil Set B. In some embodiments, the Coil set A is in persistent mode, while Coil set B is permanently online.

Alternative Designs

Figure 6A:
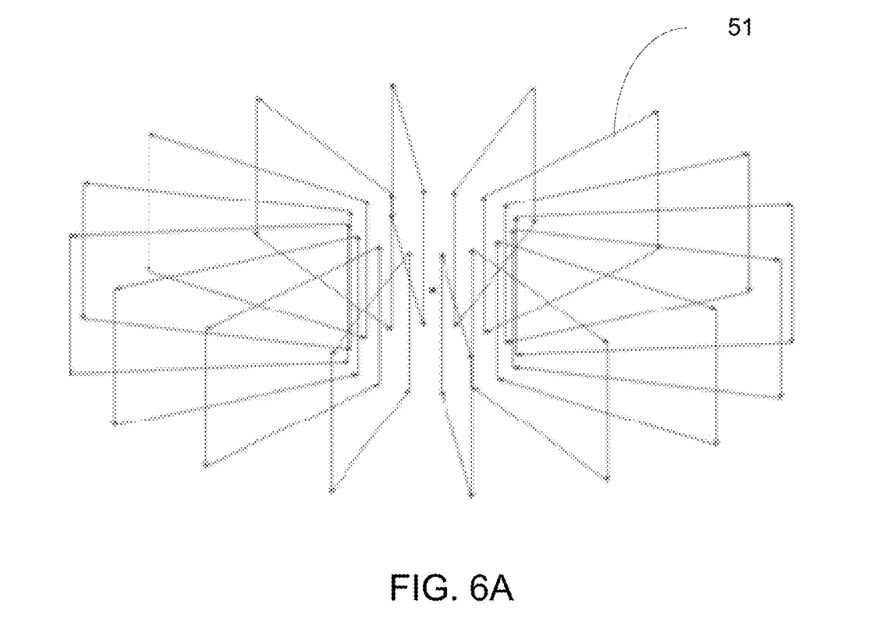
FIGS. 6A-6C depict a sample schematic of an alternative inductively decoupled dual SMES.
Figure 6B:
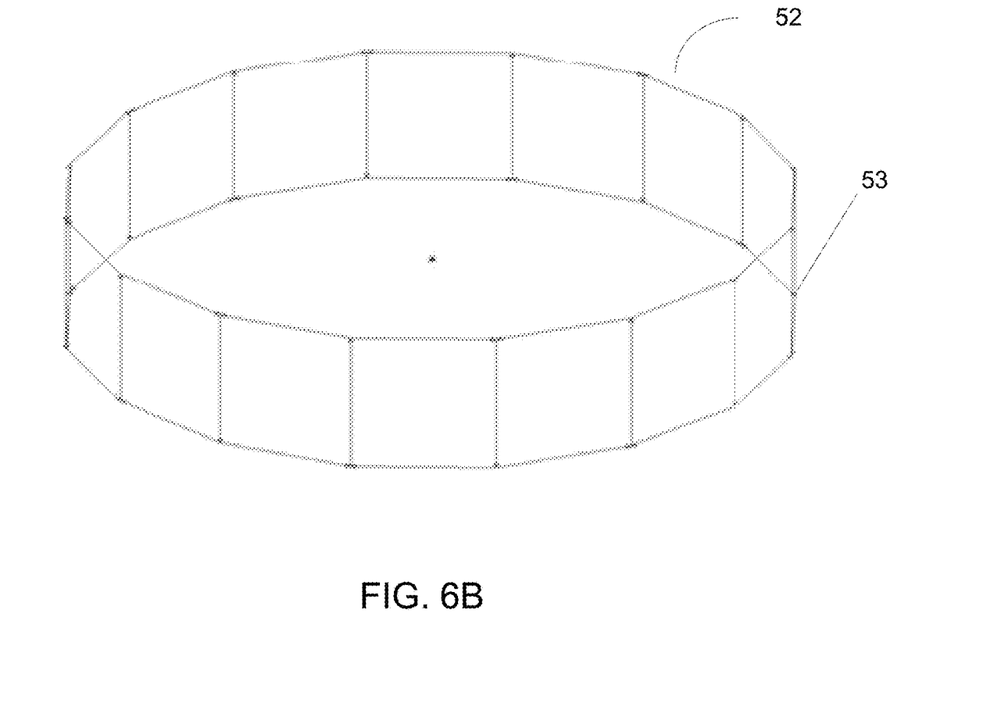
Figure 6C:
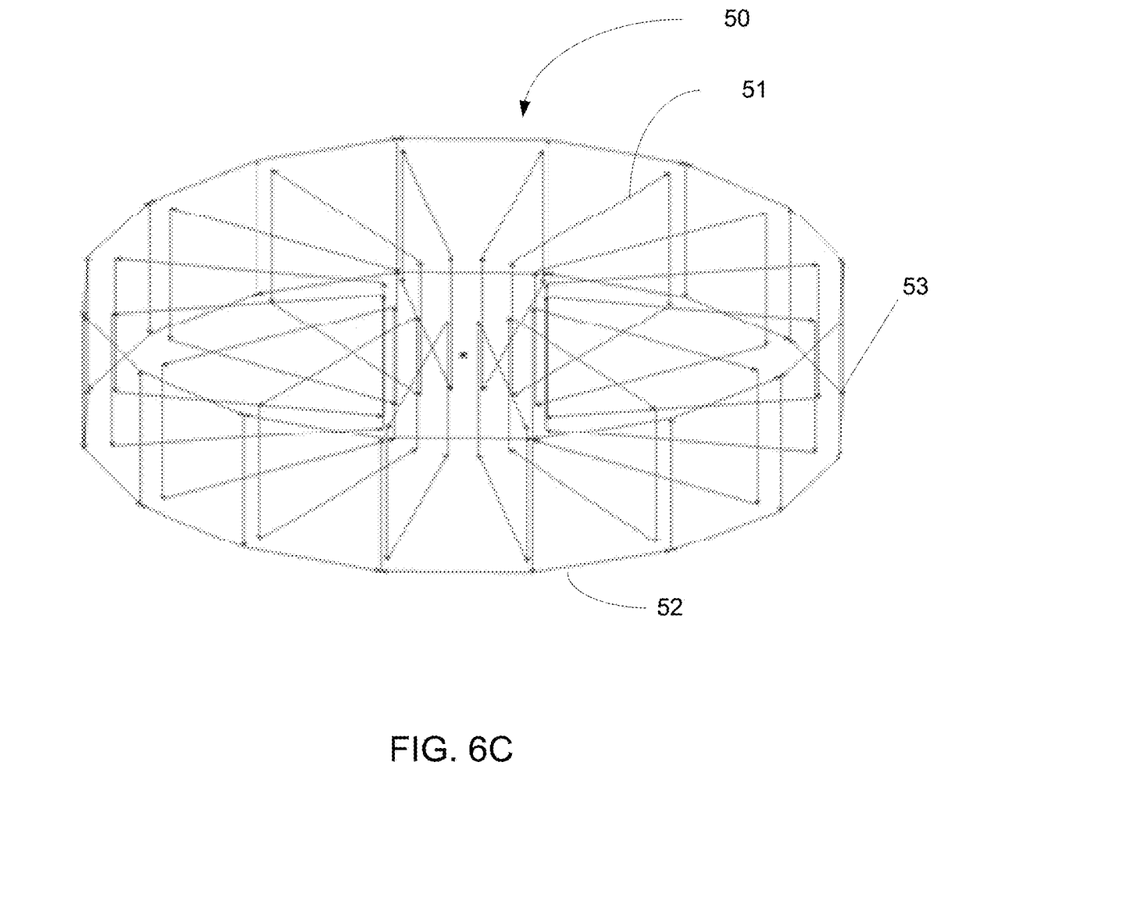

Note that other options for the topology of the primary and secondary magnet systems of a magnetically decoupled dual SMES are possible. The common characteristic of these topologies is that the mutual inductance between the primary and the secondary Coil sets is zero and consequently the balance of stored energies defined by formula (1) is valid. FIGS. 6A-6C depict a sample schematic of an alternative SMES 50, in which a toroidal Coil set A' 51 is complemented by Coil set B' 52, comprised of window-frame racetracks 53 with alternating polarities. The coils are positioned so that mutual inductance between electrical circuits formed by connected in series coils of Coil sets A' 51 and coils of Coil set B' 52 is zero.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A dual SMES system, comprising a first coil set and a second coil set, arranged such that there is no mutual inductance between the first coil set and the second coil set, wherein the first coil set and the second coil set are disposed in one cryostat, wherein the first coil set is a toroidal coil set and the second coil set comprises a plurality of window frame racetracks with alternating polarities, arranged around the first coil set.

2. A dual SMES system, comprising a first coil set and a second coil set, arranged such that there is no mutual inductance between the first coil set and the second coil set, wherein the first coil set and the second coil set are disposed in one cryostat, wherein the first coil set operates in persistent mode and the second coil set is permanently online.

3. The dual SMES system of claim 2, wherein more of total magnetic energy is stored in the first coil set than in the second coil set.

4. A dual SMES system, comprising:
a toroidal coil set; and
a solenoidal coil set, comprising a main coil and a plurality of shielding coils arranged around the main coil;
wherein the toroidal coil set is disposed in a space between the main coil and the shielding coils of the solenoidal coil set, and
wherein the toroidal coil set comprises a plurality of toroidal coils extending radially outward, each toroidal coil comprising a plurality of racetracks.

5. The dual SMES system of claim 4, wherein the toroidal coil set and the solenoidal coil set are disposed in one cryostat.

6. The dual SMES system of claim 4, wherein 80% of total magnetic energy is stored in the toroidal coil set.

7. A dual SMES system, comprising:
a toroidal coil set; and
a solenoidal coil set, comprising a main coil and a plurality of shielding coils arranged around the main coil;
wherein the toroidal coil set is disposed in a space between the main coil and the shielding coils of the solenoidal coil set, and
wherein 80% of total magnetic energy is stored in the toroidal coil set.

\* \* \* \* \*